United States Patent
Daigle et al.

(10) Patent No.: US 12,510,611 B2
(45) Date of Patent: Dec. 30, 2025

(54) TMR SENSOR HAVING MAGNETIC FIELD GENERATION FOR PILLAR STIMULATION

(71) Applicant: Allegro MicroSystems, LLC, Manchester, NH (US)

(72) Inventors: Tyler Daigle, Scarborough, ME (US); Maxwell McNally, Manchester, NH (US); Steven Daubert, Bedford, NH (US); Alexander Latham, Harvard, MA (US)

(73) Assignee: Allegro MicroSystems, LLC, Manchester, NH (US)

( * ) Notice: Subject to any disclaimer, the term of this patent is extended or adjusted under 35 U.S.C. 154(b) by 258 days.

(21) Appl. No.: 18/503,333

(22) Filed: Nov. 7, 2023

(65) Prior Publication Data

US 2025/0147128 A1 May 8, 2025

(51) Int. Cl.
*G01R 33/09* (2006.01)
(52) U.S. Cl.
CPC .................. *G01R 33/098* (2013.01)
(58) Field of Classification Search
CPC .............. G01R 33/098; G01R 33/0017; G01R 33/0052; G01R 33/093
See application file for complete search history.

(56) References Cited

U.S. PATENT DOCUMENTS

| | | |
|---|---|---|
| 4,236,832 A | 12/1980 | Komatsu et al. |
| 4,343,026 A | 8/1982 | Griffith et al. |
| 4,438,347 A | 3/1984 | Gehring |
| 4,525,668 A | 6/1985 | Lienhard et al. |
| 4,596,950 A | 6/1986 | Lienhard et al. |
| 4,691,259 A | 9/1987 | Imakoshi |
| 4,712,064 A | 12/1987 | Eckardt et al. |
| 4,752,733 A | 6/1988 | Petr et al. |
| 4,760,285 A | 7/1988 | Nelson |
| 4,823,075 A | 4/1989 | Alley |
| 4,833,406 A | 5/1989 | Foster |
| 4,847,584 A | 7/1989 | Pant |
| 4,937,521 A | 6/1990 | Yoshino et al. |
| 4,939,448 A | 7/1990 | Gudel |
| 4,939,449 A | 7/1990 | Callaneo et al. |
| 4,939,459 A | 7/1990 | Akachi et al. |
| 4,970,411 A | 11/1990 | Halg et al. |
| 5,041,780 A | 8/1991 | Rippel |
| 5,049,809 A | 9/1991 | Wakatuski et al. |
| 5,227,721 A | 7/1993 | Katnoka et al. |
| 5,247,278 A | 9/1993 | Pant et al. |
| 5,285,155 A | 2/1994 | Ueda et al. |
| 5,329,416 A | 7/1994 | Ushiyama et al. |
| 5,412,255 A | 5/1995 | Wallrafen |

(Continued)

OTHER PUBLICATIONS

U.S. Appl. No. 18/152,189, filed Jan. 10, 2023, Romero.
U.S. Appl. No. 18/458,509, filed Aug. 30, 2023, Romero.

*Primary Examiner* — Alvaro E Fortich
(74) *Attorney, Agent, or Firm* — DALY, CROWLEY, MOFFORD & DURKEE, LLP

(57) ABSTRACT

Methods and apparatus for a magnetic field sensor IC package having groups of arrays of TMR elements each having a pinning direction. An on-chip coil is routed under the TMR elements to conduct current for generating a magnetic field to stimulate the TMR elements. The device may be configured to sense changes in an applied magnetic field.

20 Claims, 12 Drawing Sheets

(56) References Cited

U.S. PATENT DOCUMENTS

| | | |
|---|---|---|
| 5,469,058 A | 11/1995 | Dunnam |
| 5,500,590 A | 3/1996 | Pant |
| 5,521,501 A | 5/1996 | Dettmann et al. |
| 5,561,366 A | 10/1996 | Takahashi et al. |
| 5,561,368 A | 10/1996 | Dovek et al. |
| 5,570,034 A | 10/1996 | Needham et al. |
| 5,621,319 A | 4/1997 | Bilotti et al. |
| 5,621,377 A | 4/1997 | Dettmann et al. |
| 5,640,090 A | 6/1997 | Furuya et al. |
| 5,719,494 A | 2/1998 | Dettmann et al. |
| 5,764,052 A | 6/1998 | Renger |
| 5,831,426 A | 11/1998 | Black, Jr. et al. |
| 5,877,705 A | 3/1999 | Sampey |
| 5,952,825 A | 9/1999 | Wan |
| 6,002,553 A | 12/1999 | Stearns et al. |
| 6,031,273 A | 2/2000 | Torok et al. |
| 6,300,617 B1 | 10/2001 | Daughton et al. |
| 6,316,931 B1 | 11/2001 | Nakagawa et al. |
| 6,323,634 B1 | 11/2001 | Nakagawa et al. |
| 6,404,191 B2 | 6/2002 | Daughton et al. |
| 6,411,078 B1 | 6/2002 | Nakagawa et al. |
| 6,429,640 B1 | 8/2002 | Daughton et al. |
| 6,436,748 B1 | 8/2002 | Forbes et al. |
| 6,437,558 B2 | 8/2002 | Li et al. |
| 6,459,255 B1 | 10/2002 | Tamai et al. |
| 6,462,541 B1 | 10/2002 | Wang et al. |
| 6,473,275 B1 | 10/2002 | Gill |
| 6,642,705 B2 | 11/2003 | Kawase |
| 6,667,682 B2 | 12/2003 | Wan et al. |
| 6,721,140 B2 | 4/2004 | Inoue et al. |
| 6,759,841 B2 | 7/2004 | Goto et al. |
| 6,781,359 B2 | 8/2004 | Stauth et al. |
| 6,853,178 B2 | 2/2005 | Hayat-Dawoodi |
| 6,896,407 B2 | 5/2005 | Nomiyama et al. |
| 7,001,783 B2 | 2/2006 | Costrini et al. |
| 7,038,448 B2 | 5/2006 | Schott et al. |
| 7,057,485 B2 | 6/2006 | Preusse et al. |
| 7,250,748 B2 | 7/2007 | Hastings et al. |
| 7,259,545 B2 | 8/2007 | Stauth et al. |
| 7,265,531 B2 | 9/2007 | Stauth et al. |
| 7,474,093 B2 | 1/2009 | Ausserlechner |
| 7,511,483 B2 | 3/2009 | Pannetier et al. |
| 7,518,354 B2 | 4/2009 | Stauth et al. |
| 7,598,601 B2 | 10/2009 | Taylor et al. |
| 7,746,056 B2 | 6/2010 | Stauth et al. |
| 7,768,083 B2 | 8/2010 | Doogue et al. |
| 7,923,996 B2 | 4/2011 | Doogue et al. |
| 7,973,527 B2 | 7/2011 | Taylor et al. |
| 8,030,918 B2 | 10/2011 | Doogue et al. |
| 8,447,556 B2 | 5/2013 | Friedrich et al. |
| 8,542,010 B2 | 9/2013 | Cesaretti et al. |
| 8,629,520 B2 | 1/2014 | Doogue et al. |
| 8,680,846 B2 | 3/2014 | Cesaretti et al. |
| 8,692,546 B2 | 4/2014 | Cesaretti et al. |
| 8,747,680 B1 | 6/2014 | Deshpande et al. |
| 8,818,749 B2 | 8/2014 | Friedrich et al. |
| 8,848,320 B1 | 9/2014 | David et al. |
| 8,885,302 B1 | 11/2014 | David et al. |
| 8,907,669 B2 | 12/2014 | Petrie |
| 8,952,471 B2 | 2/2015 | Doogue et al. |
| 9,013,838 B1 | 4/2015 | Erie et al. |
| 9,082,957 B2 | 7/2015 | Doogue et al. |
| 9,099,638 B2 | 8/2015 | Wang et al. |
| 9,116,195 B2 | 8/2015 | Yamashita et al. |
| 9,151,807 B2 | 10/2015 | Friedrich et al. |
| 9,201,122 B2 | 12/2015 | Cesaretti et al. |
| 9,645,220 B2 | 5/2017 | Cesaretti et al. |
| 9,664,752 B2 | 5/2017 | Monreal et al. |
| 9,804,222 B2 | 10/2017 | Petrie et al. |
| 9,804,249 B2 | 10/2017 | Petrie et al. |
| 9,841,485 B2 | 12/2017 | Petrie et al. |
| 9,859,489 B2 | 1/2018 | Doogue et al. |
| 10,050,193 B1 | 8/2018 | Klebanov et al. |
| 10,069,063 B2 | 9/2018 | Doogue et al. |
| 10,073,136 B2 | 9/2018 | Milano et al. |
| 10,074,939 B1 | 9/2018 | Briano |
| 10,132,879 B2 | 11/2018 | Latham et al. |
| 10,145,908 B2 | 12/2018 | David et al. |
| 10,234,513 B2 | 3/2019 | Vig et al. |
| 10,352,969 B2 | 7/2019 | Milano et al. |
| 10,396,279 B2 | 8/2019 | Deshpande et al. |
| 10,451,671 B2 | 10/2019 | Petrie et al. |
| 10,466,298 B2 | 11/2019 | Chaware et al. |
| 10,566,526 B1 | 2/2020 | Liu et al. |
| 10,670,672 B2 | 6/2020 | David et al. |
| 10,746,820 B2 | 8/2020 | Lassalle-Balier et al. |
| 10,761,120 B2 | 9/2020 | Feucht et al. |
| 10,866,287 B1 | 12/2020 | Lassalle-Balier et al. |
| 10,868,240 B2 | 12/2020 | Liu et al. |
| 10,884,031 B2 | 1/2021 | Vuillermet et al. |
| 10,908,232 B2 | 2/2021 | Latham et al. |
| 10,916,438 B2 | 2/2021 | Klebanov et al. |
| 10,935,612 B2 | 3/2021 | Belin et al. |
| 11,005,036 B2 | 5/2021 | Liu et al. |
| 11,112,230 B2 | 9/2021 | Latham et al. |
| 11,115,084 B2 | 9/2021 | Latham et al. |
| 11,169,223 B2 | 11/2021 | Ostermann et al. |
| 11,193,989 B2 | 12/2021 | Campiglio et al. |
| 11,215,681 B2 | 1/2022 | David et al. |
| 11,326,903 B1 | 5/2022 | Casu et al. |
| 11,327,127 B2 | 5/2022 | Lassalle-Balier et al. |
| 11,366,141 B1 | 6/2022 | Daubert et al. |
| 11,402,440 B2 | 8/2022 | Chaware et al. |
| 11,435,206 B2 | 9/2022 | Drouin |
| 11,460,286 B2 | 10/2022 | Gillet et al. |
| 11,555,872 B2 | 1/2023 | Romero |
| 11,630,130 B2 | 4/2023 | Rubinsztain et al. |
| 11,630,169 B1 | 4/2023 | Liu et al. |
| 11,733,316 B2 | 8/2023 | Casu et al. |
| 11,782,105 B2 | 10/2023 | Klebanov et al. |
| 2003/0042571 A1 | 3/2003 | Chen et al. |
| 2003/0151406 A1 | 8/2003 | Wan et al. |
| 2004/0012056 A1 | 1/2004 | Nejad et al. |
| 2004/0014243 A1 | 1/2004 | Drewes |
| 2004/0100727 A1 | 5/2004 | Sato et al. |
| 2005/0258820 A1 | 11/2005 | Forster |
| 2006/0114607 A1 | 6/2006 | Pinarbasi et al. |
| 2006/0164080 A1 | 7/2006 | Popovic et al. |
| 2006/0202692 A1 | 9/2006 | Tatschl et al. |
| 2007/0216408 A1 | 9/2007 | Ando et al. |
| 2007/0247141 A1 | 10/2007 | Pastre et al. |
| 2008/0144231 A1 | 6/2008 | Sato et al. |
| 2009/0001964 A1 | 1/2009 | Strzalkowski |
| 2009/0015252 A1 | 1/2009 | Raberg et al. |
| 2009/0026266 A1 | 1/2009 | Raggam |
| 2009/0085706 A1 | 4/2009 | Baarman et al. |
| 2009/0218657 A1 | 9/2009 | Rofougaran |
| 2011/0008915 A1 | 1/2011 | Nozieres et al. |
| 2011/0018533 A1 | 1/2011 | Cesaretti et al. |
| 2011/0031960 A1 | 2/2011 | Hohe et al. |
| 2011/0119015 A1 | 5/2011 | Hirobe et al. |
| 2011/0169488 A1 | 7/2011 | Mather |
| 2011/0187361 A1 | 8/2011 | Vanhelmont et al. |
| 2011/0304325 A1 | 12/2011 | Walther et al. |
| 2012/0016614 A1 | 1/2012 | Hohe et al. |
| 2012/0016625 A1 | 1/2012 | Hernandez-Oliver et al. |
| 2012/0086442 A1 | 4/2012 | Haas et al. |
| 2012/0217960 A1 | 8/2012 | Ausserlechner |
| 2012/0274314 A1 | 11/2012 | Cesaretti et al. |
| 2013/0032908 A1 | 2/2013 | Tang et al. |
| 2013/0055052 A1 | 2/2013 | Kaeriyama |
| 2013/0057256 A1 | 3/2013 | Ernst et al. |
| 2013/0057276 A1 | 3/2013 | Klein |
| 2013/0093412 A1 | 4/2013 | Anelli et al. |
| 2013/0241543 A1 | 9/2013 | Stenson et al. |
| 2014/0210023 A1 | 7/2014 | Wang |
| 2014/0332914 A1 | 11/2014 | Liou et al. |
| 2014/0347044 A1 | 11/2014 | Monreal et al. |
| 2014/0353785 A1 | 12/2014 | Paci |
| 2015/0008913 A1 | 1/2015 | Fu et al. |
| 2015/0022192 A1 | 1/2015 | Ausserlechner |
| 2015/0084972 A1 | 3/2015 | Wu et al. |
| 2015/0194597 A1 | 7/2015 | Fermon et al. |
| 2015/0200355 A1 | 7/2015 | Erie et al. |

(56) References Cited

U.S. PATENT DOCUMENTS

| | | |
|---|---|---|
| 2015/0345990 A1 | 12/2015 | David et al. |
| 2015/0354985 A1 | 12/2015 | Judkins, III et al. |
| 2016/0139229 A1 | 5/2016 | Petrie et al. |
| 2016/0139230 A1 | 5/2016 | Petrie et al. |
| 2016/0149416 A1 | 5/2016 | Ha et al. |
| 2016/0164463 A1 | 6/2016 | Zhou et al. |
| 2016/0202329 A1 | 7/2016 | Paci |
| 2016/0260772 A1 | 9/2016 | Usami et al. |
| 2016/0327617 A1* | 11/2016 | Deak .................. G01R 33/096 |
| 2017/0211935 A1* | 7/2017 | Deak ................ G01R 33/0011 |
| 2017/0371007 A1 | 12/2017 | Anderson et al. |
| 2018/0033955 A1 | 2/2018 | Wong et al. |
| 2018/0074016 A1 | 3/2018 | Chen et al. |
| 2020/0066580 A1 | 2/2020 | Peng et al. |
| 2020/0066967 A1 | 2/2020 | Suri et al. |
| 2020/0249286 A1 | 8/2020 | David et al. |
| 2020/0266337 A1 | 8/2020 | Liu et al. |
| 2021/0057642 A1 | 2/2021 | Liu et al. |
| 2021/0376227 A1 | 12/2021 | Latham et al. |
| 2022/0026469 A1 | 1/2022 | Schmitt |

\* cited by examiner

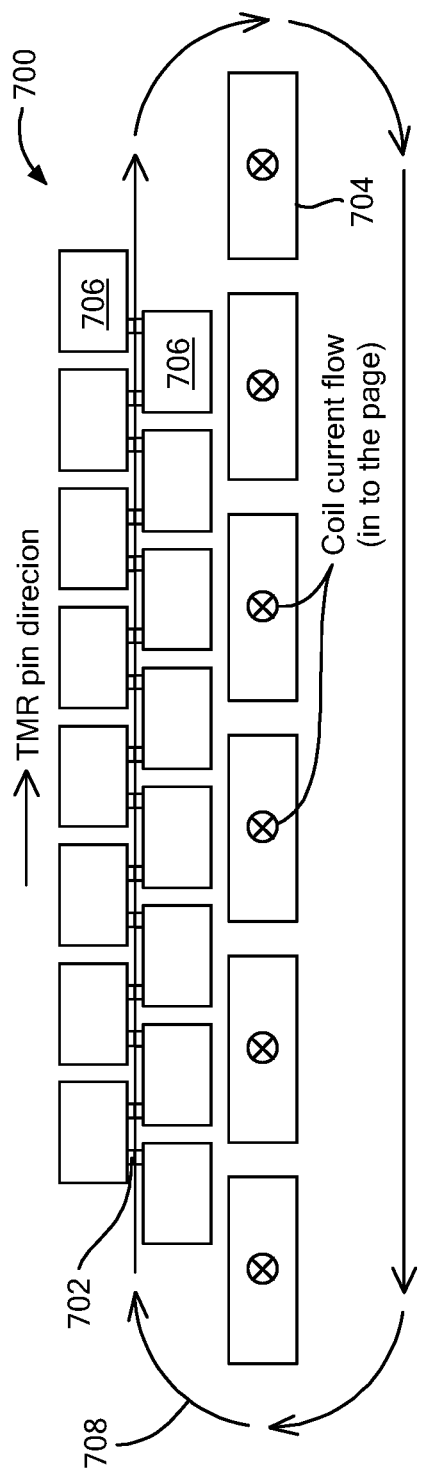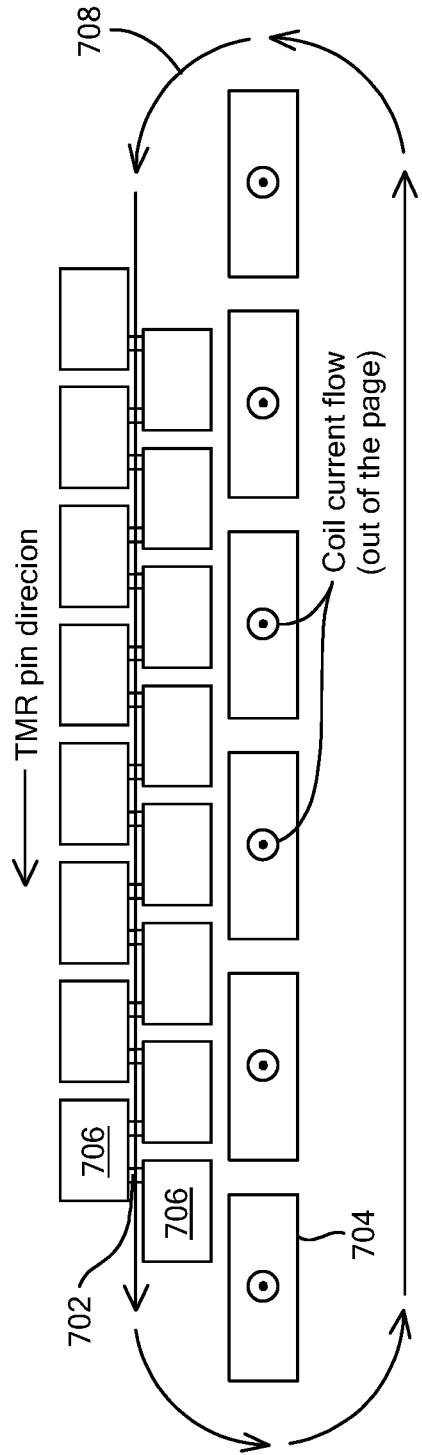
FIG. 7A
FIG. 7B

TMR SENSOR HAVING MAGNETIC FIELD GENERATION FOR PILLAR STIMULATION

BACKGROUND

Magnetic field sensors are used in a variety of applications, including, but not limited to, angle sensing that senses an angle of a direction of a magnetic field, current sensing that senses a magnetic field generated by a current carried by a current-carrying conductor, magnetic switching that senses the proximity of a ferromagnetic object, rotation detection that senses passing ferromagnetic articles, for example, magnetic domains of a ring magnet or a ferromagnetic target (e.g., gear teeth) where the magnetic field sensor is used in combination with a back-biased or other magnet, and magnetic field sensing that senses a magnetic field density of a magnetic field.

In certain applications, magnetic field sensors include magnetoresistance (MR) elements. These elements have an electrical resistance that changes in the presence of an external magnetic field. Spin valves are a type of magnetoresistance element formed from two or more magnetic materials or layers. The simplest form of a spin valve has a reference (or magnetically fixed) layer and a free layer. The resistance of the spin valve changes as a function of the magnetic alignment of the reference and free layers. Typically, the magnetic alignment of the reference layer does not change, while the magnetic alignment of the free layer moves in response to external magnetic fields.

In some cases, a spin valve may also have a bias. The bias may be generated by one or more magnetic layers (bias layers) that are magnetically coupled to the free layer. In the absence of an external magnetic field, the bias layers may cause the magnetic alignment of the free layer to default to a predetermined alignment. The magnetic coupling between the bias layers and the free layer is relatively weak so that an external field can override the bias and realign the magnetic alignment of the free layer.

In known sensors, it can be challenging to generate a magnetic field that stimulates all TMR pillars. Generally, TMR elements are sensitive to a lateral magnetic field in the direction of which they are pinned. In conventional configurations, it may be necessary to generate an external magnetic field to verify pinning at a wafer probe, trim signal path components, compensate signal path distortions, and/or pin the TMR pillars.

SUMMARY

Embodiments of the disclosure provide methods and apparatus for a MR sensor having an on-chip coil to generate a lateral magnetic field. In embodiments, the on-chip coil is routed in one or more metal layers. Example on-chop coil configurations may eliminate the need for additional over-TMR metal layers, such as ML and VL. The coil may comprise metal routes running underneath the TMR elements such that a current flow induced magnetic field is generated perpendicularly above the coil and through the TMR elements. In embodiments, the generated field runs parallel to the direction in which the TMR elements are pinned. In the case of a magnetometer MR bridge, devices are pinned in two opposing directions. In example embodiments, to generate a field to stimulate MR devices pinned in opposite directions, the coil routes run in a serpentine manner such that TMR elements pinned in direction A are placed over the routes of the coil that generate a field in direction A, and TMR elements pinned in direction B (180° from direction A) are placed over the routes of the coil that generate a field in direction B. With this arrangement, the coil does not require large excess loops outside of where the TMR resides so that the coils can be kept within the TMR area for reducing the resistance of the coil, which reduces the voltage needed to drive the current to allow for additional field generation.

In one aspect, a magnetic field sensor IC package device comprises: groups of arrays having TMR elements, wherein each of the TMR elements has a pinning direction; and an on-chip coil routed under the TMR elements configured to conduct current for generating a magnetic field to stimulate the TMR elements, wherein the device is configured to sense changes in an applied magnetic field.

A device can further include one or more of the following features: the on-chip coil is formed in one or more metal layers of the device, the on-chip coil is formed in one single metal layer, a first end of the coil is configured to connect to a current source for generating the magnetic field in a direction that matches the pinning direction of the TMR elements, a first end of the coil is configured to connect to a current source for generating the magnetic field in a direction that is an opposite direction of the pinning direction of the TMR elements, the TMR arrays are connected to form a bridge, routing of the coil is serpentine, the coil is configured to stimulate all of the TMR elements with a same polarity magnetic field, the magnetic field generated by the coil is configured to cause a resistance of a bridge formed by the TMR arrays to change but not to cause the bridge to generate a differential output voltage, the TMR arrays are arranged in columns, and/or the TMR arrays are coupled to form a bridge having total resistance that changes as a function of a level of current through the on-chip coil.

In another aspect, a method comprises: employing groups of arrays having TMR elements in a magnetic field sensor IC package device, wherein each of the TMR elements has a pinning direction; and employing an on-chip coil routed under the TMR elements configured to conduct current for generating a magnetic field to stimulate the TMR elements, wherein the device is configured to sense changes in an applied magnetic field.

A method can further include one or more of the following features: the on-chip coil is formed in one or more metal layers of the device, the on-chip coil is formed in one single metal layer, a first end of the coil is configured to connect to a current source for generating the magnetic field in a direction that matches the pinning direction of the TMR elements, a first end of the coil is configured to connect to a current source for generating the magnetic field in a direction that is an opposite direction of the pinning direction of the TMR elements, the TMR arrays are connected to form a bridge, routing of the coil is serpentine, the coil is configured to stimulate all of the TMR elements with a same polarity magnetic field, the magnetic field generated by the coil is configured to cause a resistance of a bridge formed by the TMR arrays to change but not to cause the bridge to generate a differential output voltage, the TMR arrays are arranged in columns, and/or the TMR arrays are coupled to form a bridge having total resistance that changes as a function of a level of current through the on-chip coil.

BRIEF DESCRIPTION OF THE DRAWINGS

The foregoing features of this invention, as well as the invention itself, may be more fully understood from the following description of the drawings in which:

FIGS. 7A and 7B combine to form a cross section along a portion of the sensor of FIG. 6;

DETAILED DESCRIPTION

Figure 1:
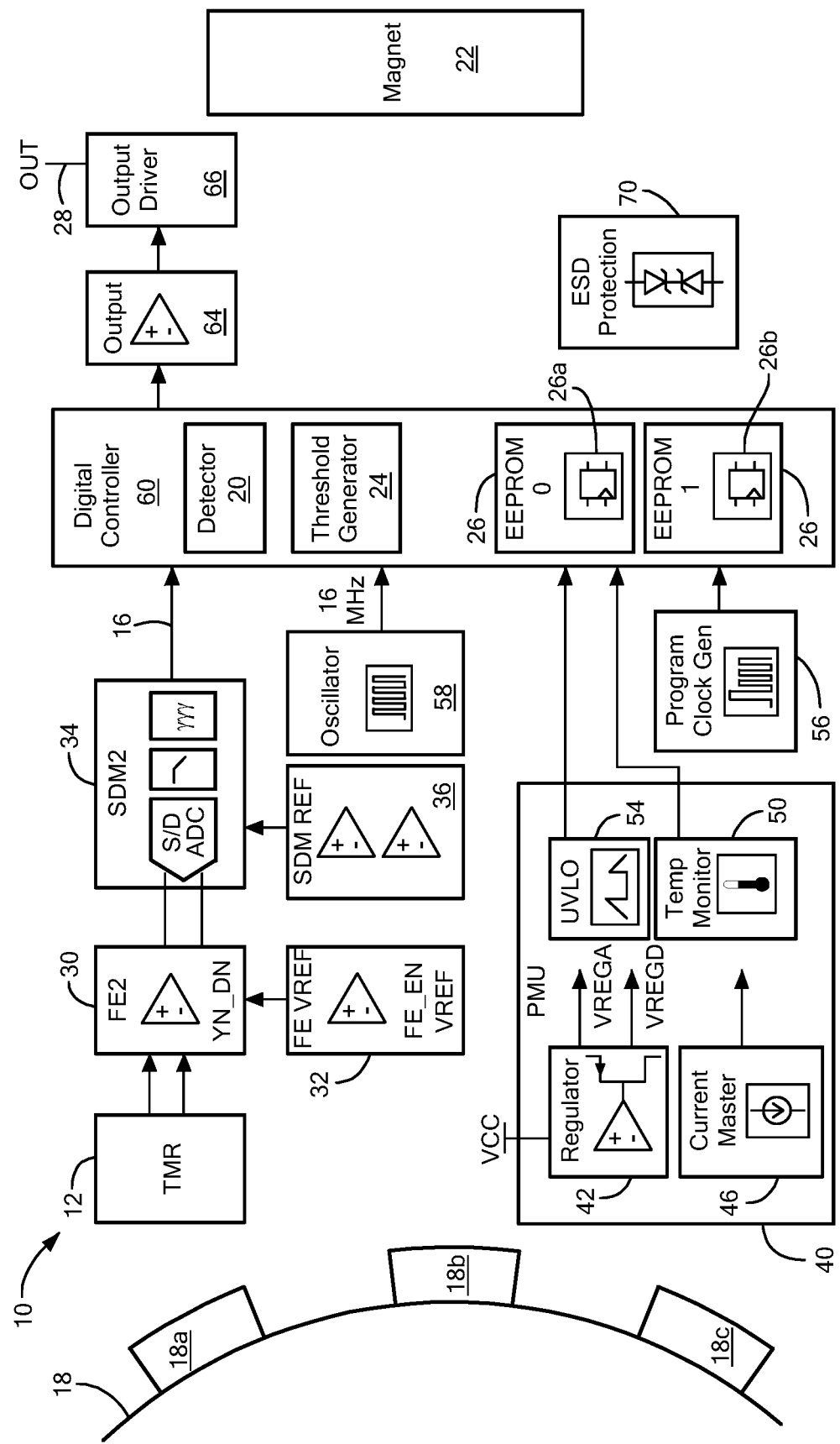
FIG. 1 is a schematic representation of an example sensor having on a coil for on-chip magnetic field generation.

FIG. 1 shows an example MR magnetic field sensor 10 having on-chip magnetic field generation for MR element stimulation in accordance with example embodiments of the disclosure. The sensor 10 is configured to generate a magnetic field signal 16 indicative of a magnetic field associated with a target 18 and a detector 20 responsive to the magnetic field signal and to a threshold level from a threshold generator 24 to generate a sensor output signal 28 containing transitions associated with features of the target in response to the magnetic field signal crossing the threshold level.

The target 18 can have a variety of forms, including, but not limited to a gear having gear teeth 18a-18c or a ring magnet having one or more pole pair. Also, linear arrangements of ferromagnetic objects that move linearly are possible. In the example embedment of FIG. 1, magnetic field sensor 10 may take the form of a rotation detector to detect passing gear teeth, for example, gear teeth 18a-18c of a ferromagnetic gear or, more generally target object 18. A permanent magnet 22 can be placed at a variety of positions proximate to the gear 18, resulting in fluctuations of a magnetic field proximate to the gear as the gear rotates in a so-called "back-bias" arrangement.

Features of the target 18 are spaced from the sensing elements 12 by an airgap. Although intended to be fixed once the sensor 10 is in place in a particular application, the airgap can vary for a variety of reasons. A difference between angles of the transitions of the sensor output signal 28 and locations of the associated features 18a-18c of the target 28 is referred to as a "hard offset."

Sensing elements 12 can take a variety of forms, such as TMR elements, as may be arranged in one or more bridge or other configurations in order to generate one or more single-ended or differential signals indicative of the sensed magnetic field. A front-end amplifier 30 can be used to process the magnetic field sensing element output signal to generate a further signal for coupling to an analog-to-digital converter (ADC) 34 as may include one or more filters, such as a low pass filter and/or notch filter, and as may take the form of a sigma delta modulator to generate a digital magnetic field signal 16. Features of the magnetic field signal processing can include a front-end reference 32 and a sigma delta reference 36.

Sensor 10 includes a power management unit (PMU) 40 as may contain various circuitry to perform power management functions. For example, a regulator 42 can output a regulated voltage for powering analog circuitry of the sensor (VREGA) and/or a regulated voltage for powering digital circuitry of the sensor (VREGD). A bias current source 46, a temperature monitor 50 and an undervoltage lockout 54 can monitor current, temperature, and voltage levels and provide associated status signals to a digital controller 60. A clock generation element 56 and an oscillator 58 are coupled to the digital controller 60.

Digital controller 60 processes the magnetic field signal 16 to determine the speed, position, and/or direction of movement, such as rotation of target 18 and outputs one or more digital signals to an output protocol module 64. More particularly, controller 60 determines the speed, position, and/or direction of target 18 based on the magnetic field signal 16 and can combine this information with fault information in some embodiments to generate the sensor output signal 28 in various formats. The output of module 64 is fed to an output driver 66 that provides the sensor output signal 28 in various formats, such as a so-called two-wire format in which the output signal is provided in the form of current pulses on the power connection to the sensor or a three-wire format in which the output signal is provided at a separate dedicated output connection. Formats of the output signal 28 can include variety of formats, for example a pulse-width modulated (PWM) signal format, a Single Edge Nibble Transmission (SENT) format, a Serial Peripheral Interface (SPI) format, a Local Interconnect Network (LIN) format, a CAN (Controller Area Network) format, an Inter-Integrated Circuit ($I^2C$) format, or other similar signal formats. Sensor 10 can further include electrostatic discharge (ESD) protection 70.

The digital controller 60 includes detector 20, threshold generator 24, and memory 26 such as EEPROMs 26a, 26b. Memory 26 can be used to store values for various sensor functionality including storing function coefficients for use by the threshold generator 24 in generating the adaptive threshold levels for use by detector 20.

Detector 20 is coupled to receive the threshold level thus generated and the magnetic field signal 16 and compare the received levels to generate a binary, two-state, detector output signal that has transitions when the signal 16 crosses the threshold level. Movement speed of the target 18 can be detected in accordance with the frequency of the binary signal.

It should be appreciated that a direction of rotation of the target 28 may be determined in embodiments containing multiple sensing elements 12 configured to generate phase separated magnetic field signals (as are sometimes referred to as channel signals), in which case the direction of rotation can be determined based on a relative phase or relative time difference (e.g., lag or lead) of a particular edge transition of detector output signals associated with the phase separated magnetic field signals.

It is understood that embodiments of MR-based sensing elements are useful in a wide variety of magnetic sensors. While an example sensor is shown and described above, any practical magnetic sensor in which MR sensing elements are desirable can be provided. For example, MR sensing elements are useful in many magnetic positions and angle sensors that require high resolution. Further example sensors in which MR-based sensing elements are shown and described below.

Figure 2:
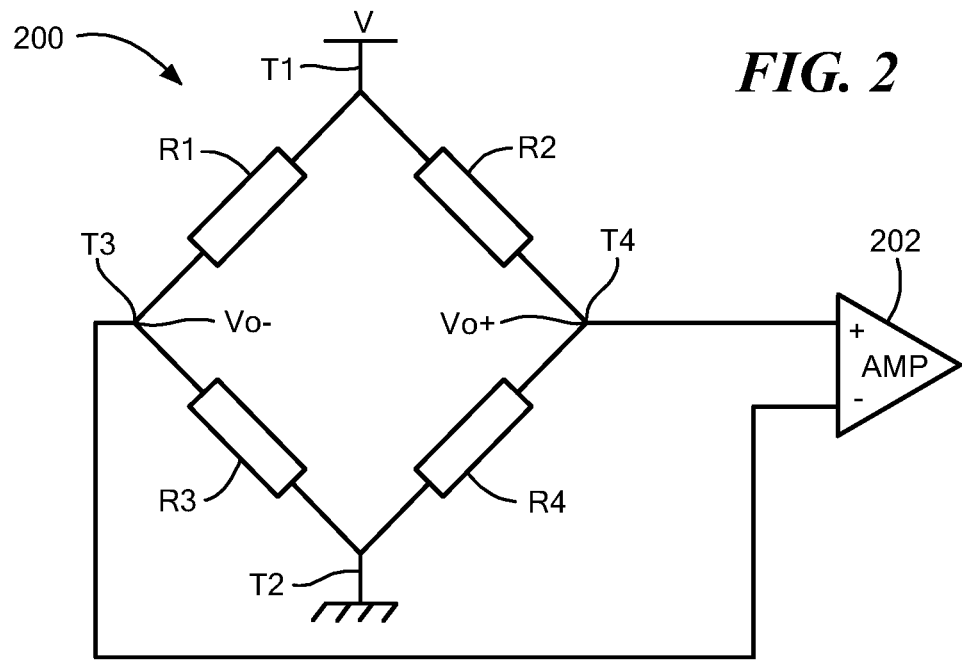
FIG. 2 is schematic representation of an MR bridge with MR elements.

FIG. 2 shows an example TMR bridge 200 having a first resistor R1, a second resistor R2, a third resistor R3, and fourth resistor R4 coupled in a bridge configuration, which can correspond to the sensing elements 12 of FIG. 1. A first terminal T1 is coupled to a voltage or current source and a second terminal T2 is coupled to ground or negative voltage or current source. A third terminal T3 provides a first differential output signal Vo− and a fourth terminal T4 provides a second differential output signal Vo+. The differential output Vo+, Vo− of the bridge can be provided to an amplifier AMP 202 or other circuitry for processing of the output of the magnetic field sensing elements, such as described above.

Figure 3:
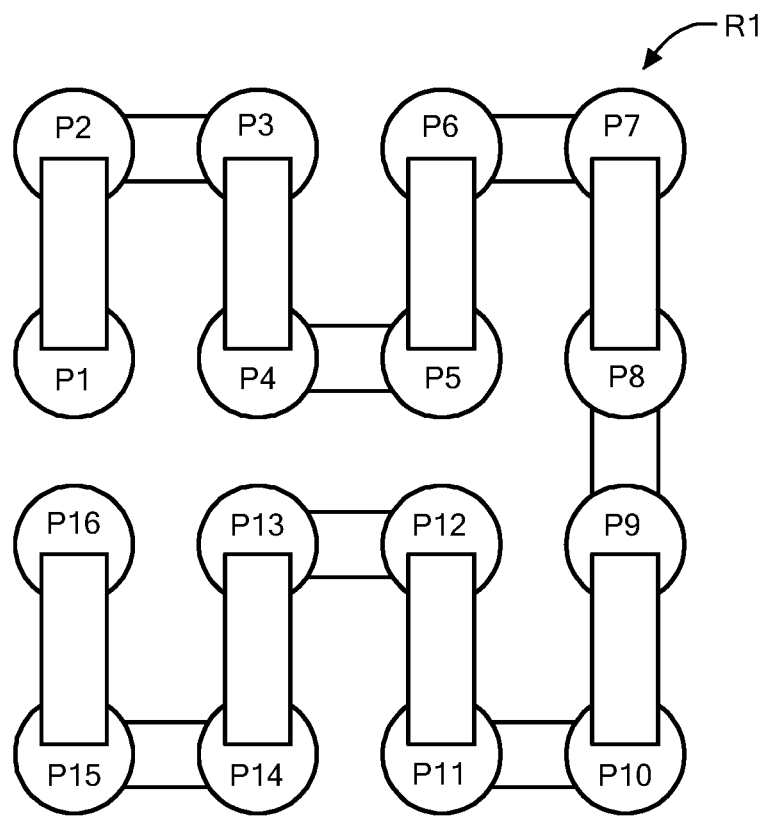
FIG. 3 is a schematic representation of a bridge resistor having TMR pillars.

FIG. 3 shows an example implementation in which bridge resistor R1 contains sixteen pillars P1-16 that provide the total resistance for R1. It is understood that a TMR resistor that provides a leg of the bridge can comprise any practical number of pillars connected in series and/or in parallel to provide the TMR bridge resistor. Pillars can be designed to have the same or different resistances.

Figure 4:
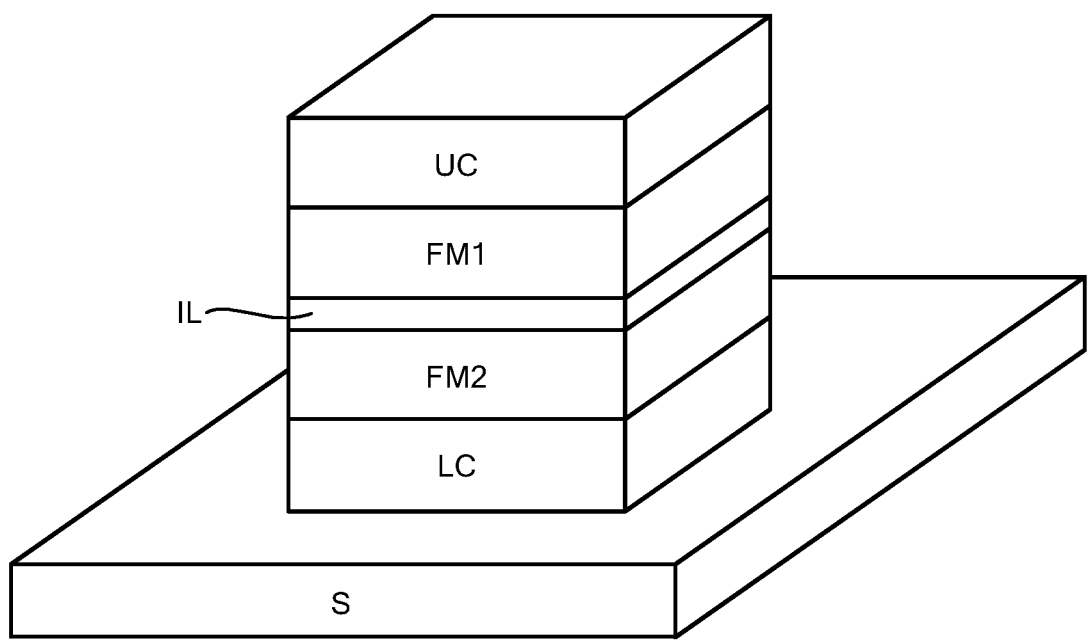
FIG. 4 is a schematic representation of a MTJ with tunneling magnetoresistance.

FIG. 4 shows an example magnetic tunnel junction (MTJ) that uses TMR to provide TMR elements, e.g., pillars. As is known in the art, tunneling magnetoresistance (TMR) occurs in a magnetic tunnel junction (MTJ) which has first and second ferromagnets FM1, FM2 separated by a thin insulative layer IL, such as MgO. An upper contact UC can be provided on the first ferromagnet FM1 and a lower contact LC can be provided on the second ferromagnet FM2. A substrate S can support the MTJ structure. The insulative layer should be thin, in the order of a few nanometers, so as to allow electrons to 'tunnel' from one of the ferromagnets to the other. It will be appreciated that this is a quantum mechanical phenomenon.

The direction of the two magnetizations of the ferromagnetic films FM1, FM2 can be switched individually by an external magnetic field. If the magnetizations are in a parallel orientation, it is more likely that electrons will tunnel through the insulating film IL than if they are in the oppositional (antiparallel) orientation. Consequently, such a junction can be switched between two states of electrical resistance, one with low resistance and one with high resistance.

It is understood that the directions of FM1 and FM2 do not necessarily have to be switched: if the external field angle is neither parallel or anti-parallel then the resulting magnetization changes as the composite angle between the external field and the reference layer. The resistance variation is proportional to the cosine of such composite angle which makes TMR elements useful for angle sensing applications.

Electrons with certain spin orientation ("spin-up" or "spin-down") can tunnel from one ferromagnetic layer to another ferromagnetic layer through the non-conductive thin insulating layer if there are available free states with the same spin orientation. In case of the parallel state, the majority spin ("spin-up") electrons and minority spin ("spin-down") electrons can tunnel to the second ferromagnetic layer and fill majority ("up") and minority ("down") states, respectively. This will result in large conductance and corresponds to the low resistive state. In case of the anti-parallel state, the majority spin ("spin-down") electrons and minority spin ("spin-up") electrons from first ferromagnetic layer fill the minority ("down") and majority ("up") states in the second ferromagnetic layer, respectively. This will result in the low conductance and correspond to the high resistive state. Tunneling magnetoresistance is described in J. Mathon, *Theory of Tunneling Magnetoresistance*, 76 PHASE TRANSITIONS 491-500 (2003), which is incorporated herein by reference.

Embodiments of the disclosure provide an MR sensor having an on-chip coil to generate a lateral magnetic field. In embodiments, the on-chip coil is routed in one or more metal layers. The coil may comprise metal routes running underneath TMR elements such that a current flow induced magnetic field is generated perpendicularly above the coil and through the TMR elements. In embodiments, the generated field runs parallel to the direction in which the TMR elements are pinned. In the case of a magnetometer MR bridge, devices are pinned in two opposing directions. In example embodiments, to generate a field to stimulate MR devices pinned in opposite directions, the coil routes run in a serpentine manner for consistent field application in relation to pinning orientation, as described more fully below.

Figure 5:
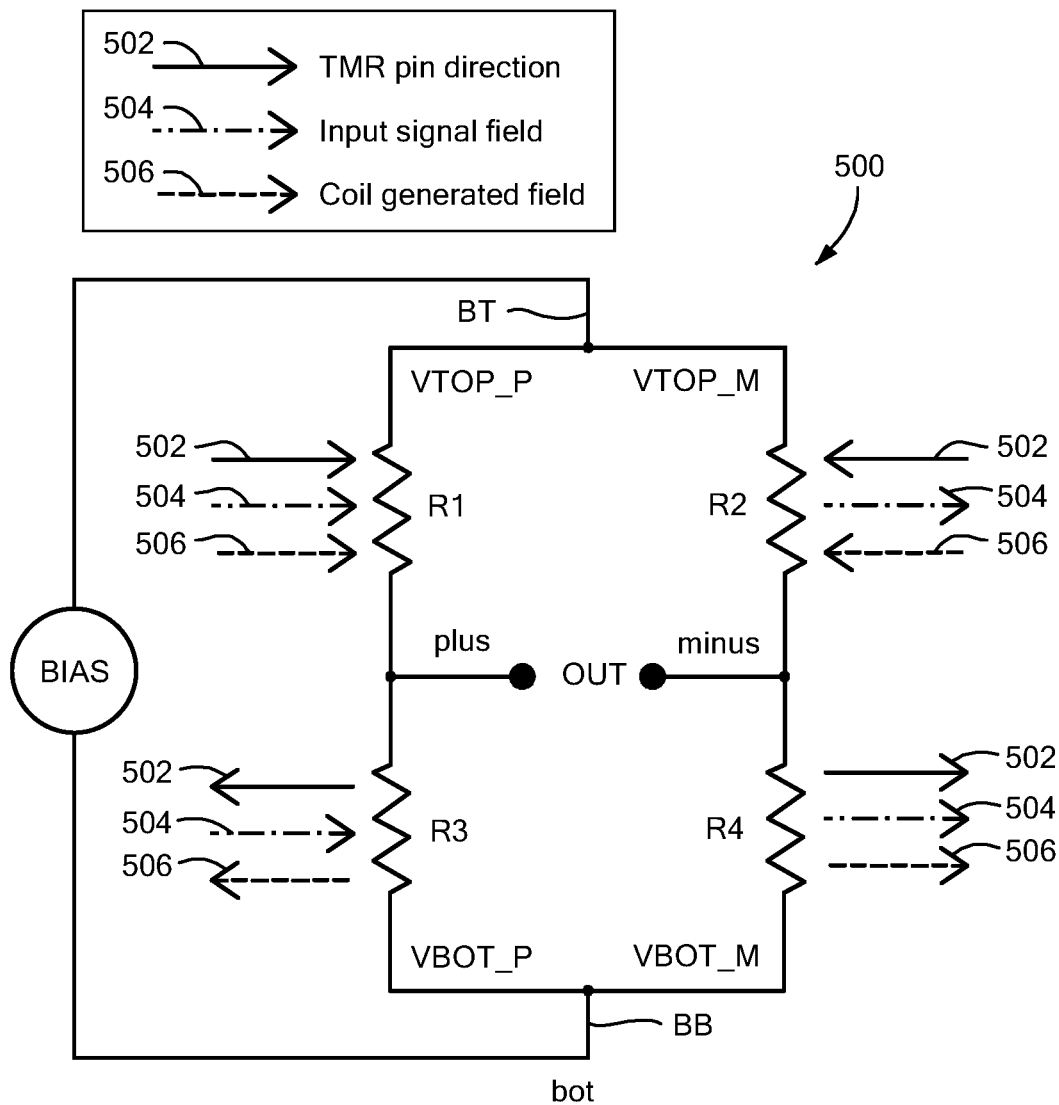
FIG. 5 is a schematic representation of sensing bridge formed of pinned TMR elements and subject to an on-chip coil generated field.

FIG. 5 shows an example Wheatstone bridge 500 having first, second, third, and fourth MR elements R1, R2, R3, R4 having respective pinning orientations indicated by respective arrows 502. A first leg of the bridge extends from node VTOP_P to the first MR element R1, to the second MR element R3 to node VBOT_P. A second leg of the bridge extends from node VTOP_M to the third MR element R2, to the fourth MR element R4 to node VBOT_M. The first and fourth MR elements R1, R4 may comprise the same nominal resistance and the second and third MR elements R2, R3 may comprise the same nominal resistance. Nodes VOUT_P, VOUT_M provide an output voltage OUT that corresponds to an applied magnetic field in the sensitive axis due to changes in resistance in the presence of the field. Wheatstone bridges of MR elements for sensing magnetic fields are well known in the art. As described more fully below, arrows 504 indicate the orientation of input signal field on the bridge resistors R1, R2, R3, R4 and arrows 506 indicate the orientation of an on-chip coil generated field.

As can be seen, the MR devices R1, R2, R3, R4 are each pinned in one of two opposite directions. The bridge can be biased with a BIAS element with either voltage or current, and output can be measured as either voltage or current. The input signal field 504 aligns to the pinned direction 502 of R1 and R4 causing these resistances to increase (or decrease), where the input signal field 504 opposes the pinned direction of R2 and R3 causing these resistances to decrease (or increase). This creates a differential output signal while causing insignificant change to the overall bridge resistance, as measured from the top BT to the bottom BB of the bridge. The input signal field 504 can be estimated by measuring the differential output voltage OUT, such as by connection to a high input impedance gain stage, or output current, such as by connecting to a low input impedance gain stage. The integrated coil (see FIG. 6 etc.) generates a magnetic field that excites all MR bridge elements R1, R2, R3, R4 with the same polarity. The coil generated field aligns to (or opposes) the pinned direction 502 of elements R1, R2, R3, and R4, which means that a coil generated field does not create a differential output signal. On the other hand, a coil generated field causes the overall bridge resistance to change. The coil generated field can be estimated by measuring a bias current when driven with voltage, or voltage, when driven by current. The ability to excite the entire MR bridge without affecting the differential signal allows sensitivity measurement and compensation to be done continuously. In contrast, conventional coil implementations are used to generate a differential bridge output signal.

Figure 6:
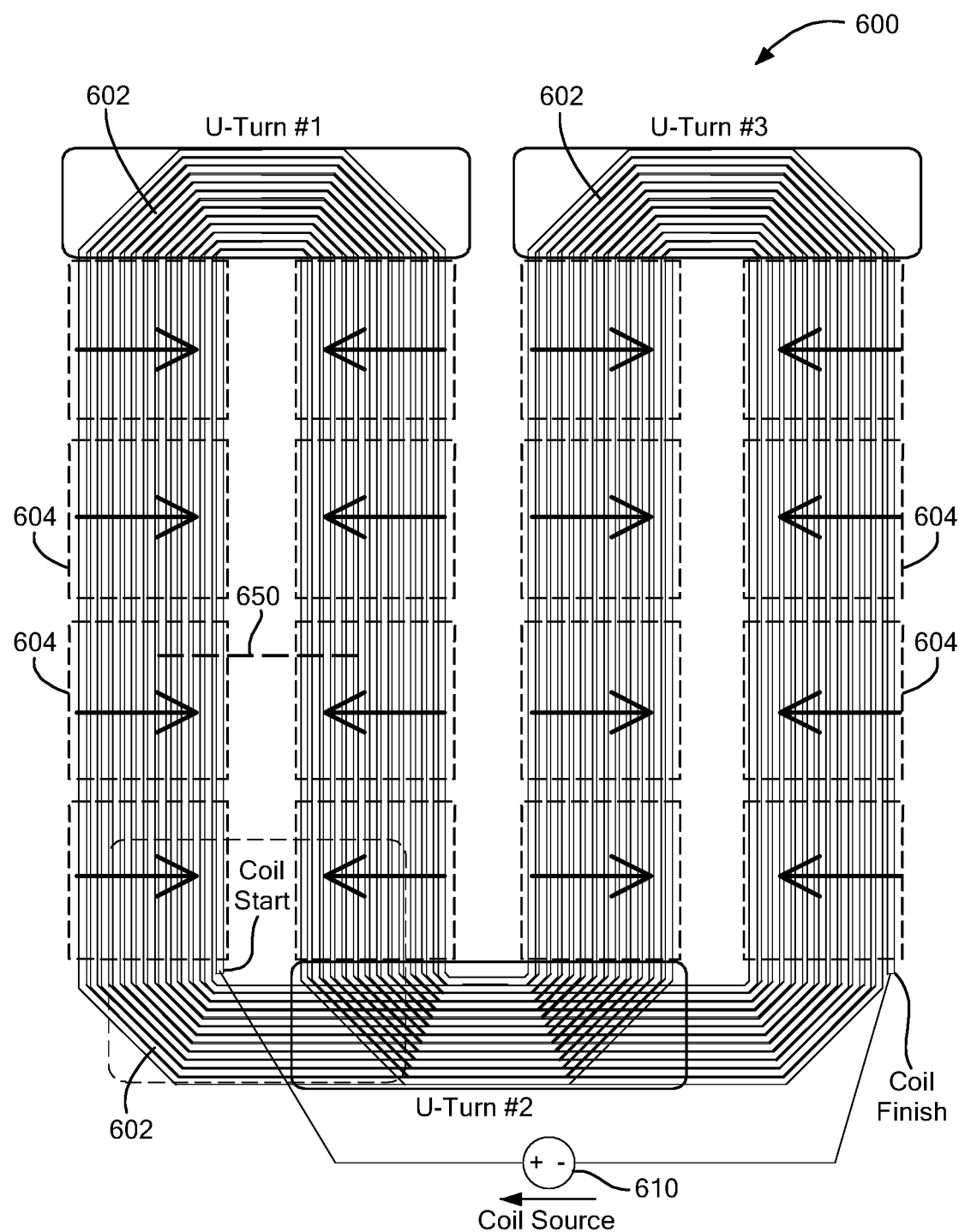
FIG. 6 is a schematic representation of a sensor including arrays of TMR elements having pillars aligned with a coil to conduct current and generate a magnetic field on the pillars.

As shown in FIG. 6, in an example embodiment 600, an on-chip coil 602 is implemented by running a single metal trace, or set of metal traces, under the MR elements R1, R2, R3, R4 and looping back and forth in a serpentine pattern until the entire bridge is covered. As can be seen, the coil 602 U-turns at the top and bottom of the columns of arrays. In the illustrated embodiment, each column of TMR arrays 604 forms one of the bridge elements R1, R2, R3, R4, where each array has a pinning direction indicated by respective arrows. In embodiments, only existing metal layers are utilized so that no additional over-MR metal layers or vias are needed, which reduces wafer cost and allows for laser pinning. In addition, over-MR metal layers ML and VL used in conventional sensors to implement a coil built vertically that wraps completely around the MR elements are no longer needed.

In embodiments, to excite all MR elements R1, R2, R3, R4 with the same polarity, the coil 602 traces must conduct current +90° relative to the MR pinned direction. The coil 602 routes generate a magnetic field that wraps around the route and goes laterally through the MR element above it. The coil U-turns occur where the MR pinned direction is flipped so that the coil generated field is always aligned to (or opposed to) the pinning.

In an example embodiment, the TMR elements R1, R2, R3, R4 correspond to square arrays 604 grouped into four columns where interleaving columns are pinned in opposite directions as indicated. To generate the aligning (or opposing) magnetic field to all TMR elements, the coil 602 routes conduct current up when above TMR elements are pinned right and down when above TMR elements are pinned left when the coil is connect to a voltage or current source 610 between net "coil start" and net "coil finish". The serpentine style of coil 602 routing maximizes area efficiency as the only additional area needed by the coil is for the U-turns indicated by boxes.

Figure 6A:
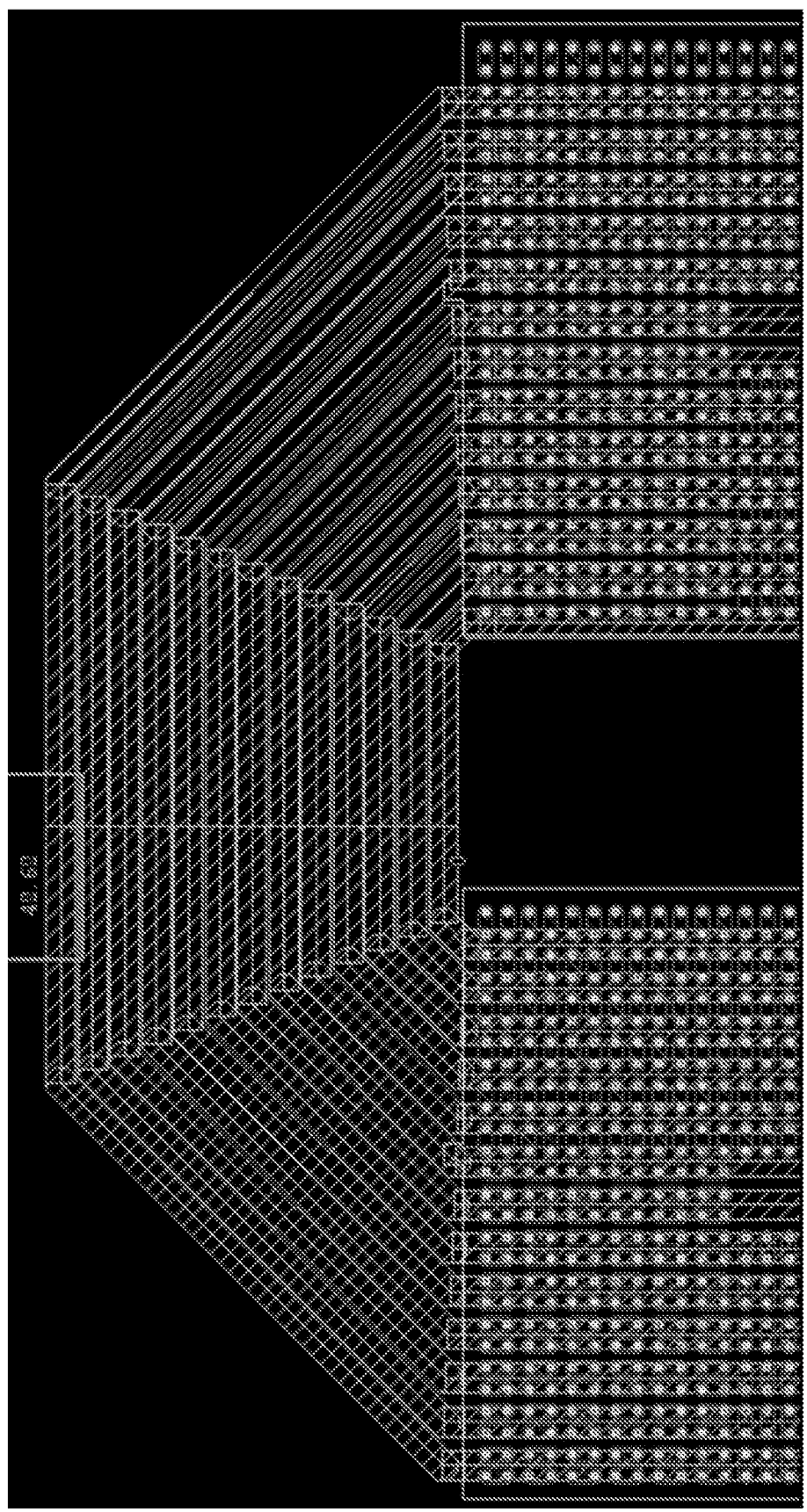
FIG. 6A shows a portion of adjacent TMR arrays and coil turns in a single metal layer and FIG. 6B shows a portion of adjacent TMR arrays and coil turns in a multiple metal layers.
Figure 6B:
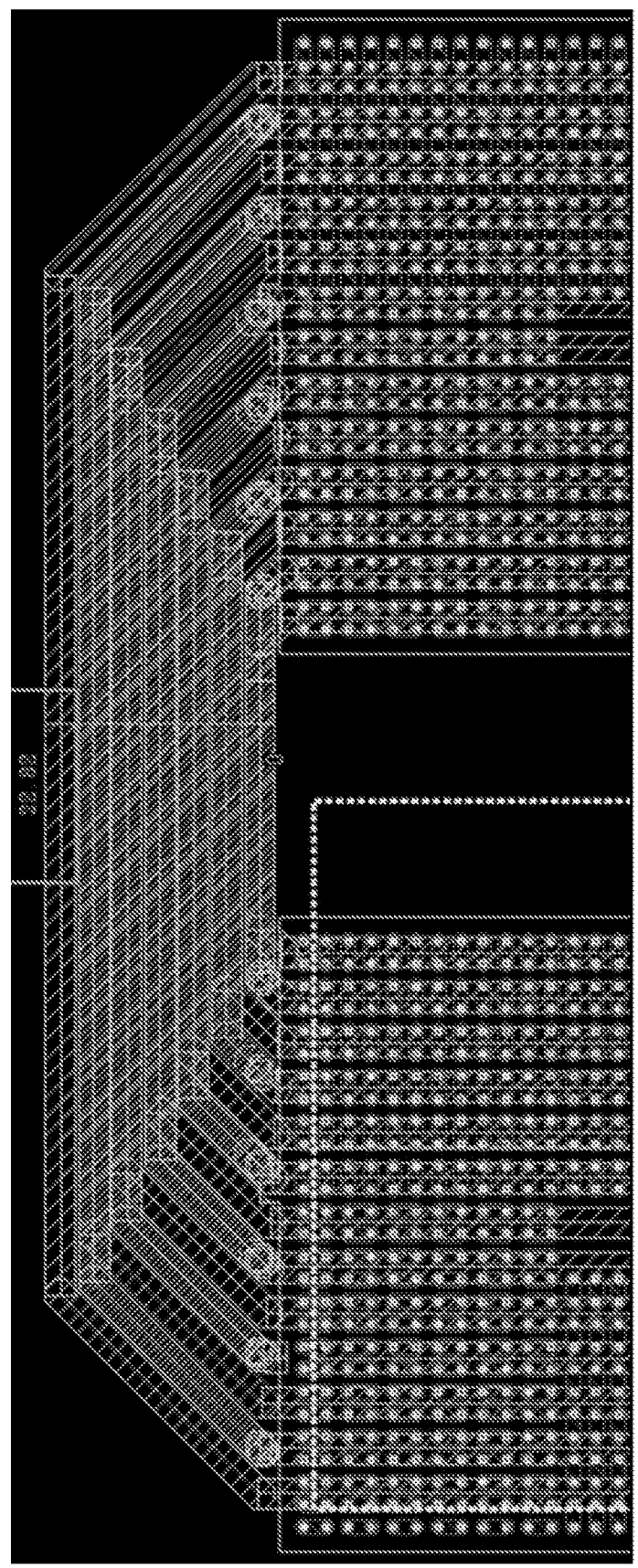

In embodiments, additional coil loops can be used to generate larger magnetic fields with the same amount of current at the cost of higher total coil resistance and reduced metal width to fit in same area. To further reduce area used by the coil U-turns, additional lower levels of metal can be used (assuming additional lower levels of metal are available). FIG. 6A shows routing with U-turns in one layer. FIG. 6B shows two overlapping metal layers with the potential area savings highlighted. It is appreciated that minimizing the number of metal layers for the coil frees up metal layers that can be used for active circuitry underneath the MR bridge.

Figure 7C:
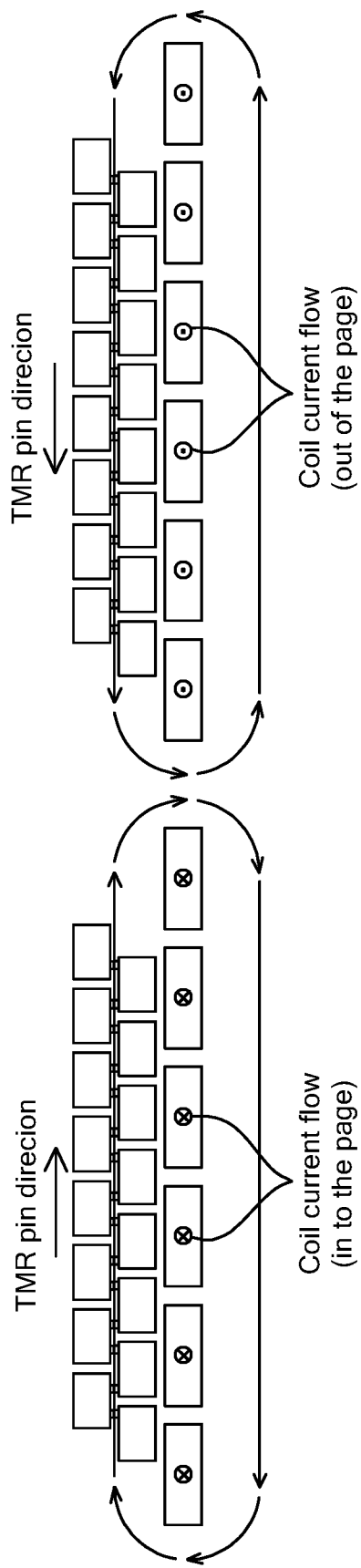
FIG. 7C shows the cross section of FIGS. 7A and 7B.

FIGS. 7A and 7B show a cross section 700 of the example layout of TMR pillars and coil taken at the dashed line 650 in FIG. 6. It is understood that the views shown FIGS. 7A and 7B are next to each other, as shown in FIG. 7C. As noted above, FIGS. 7A and 7B together show the cross section 650 in FIG. 6. FIGS. 7A and 7B show an example embodiment of TMR pillars 702, coil metal routing 704, and TMR metal routing 706. The magnetic field 708 is generated either clockwise or counterclockwise around the coil 704 depending on direction of current flow.

Figure 7D:
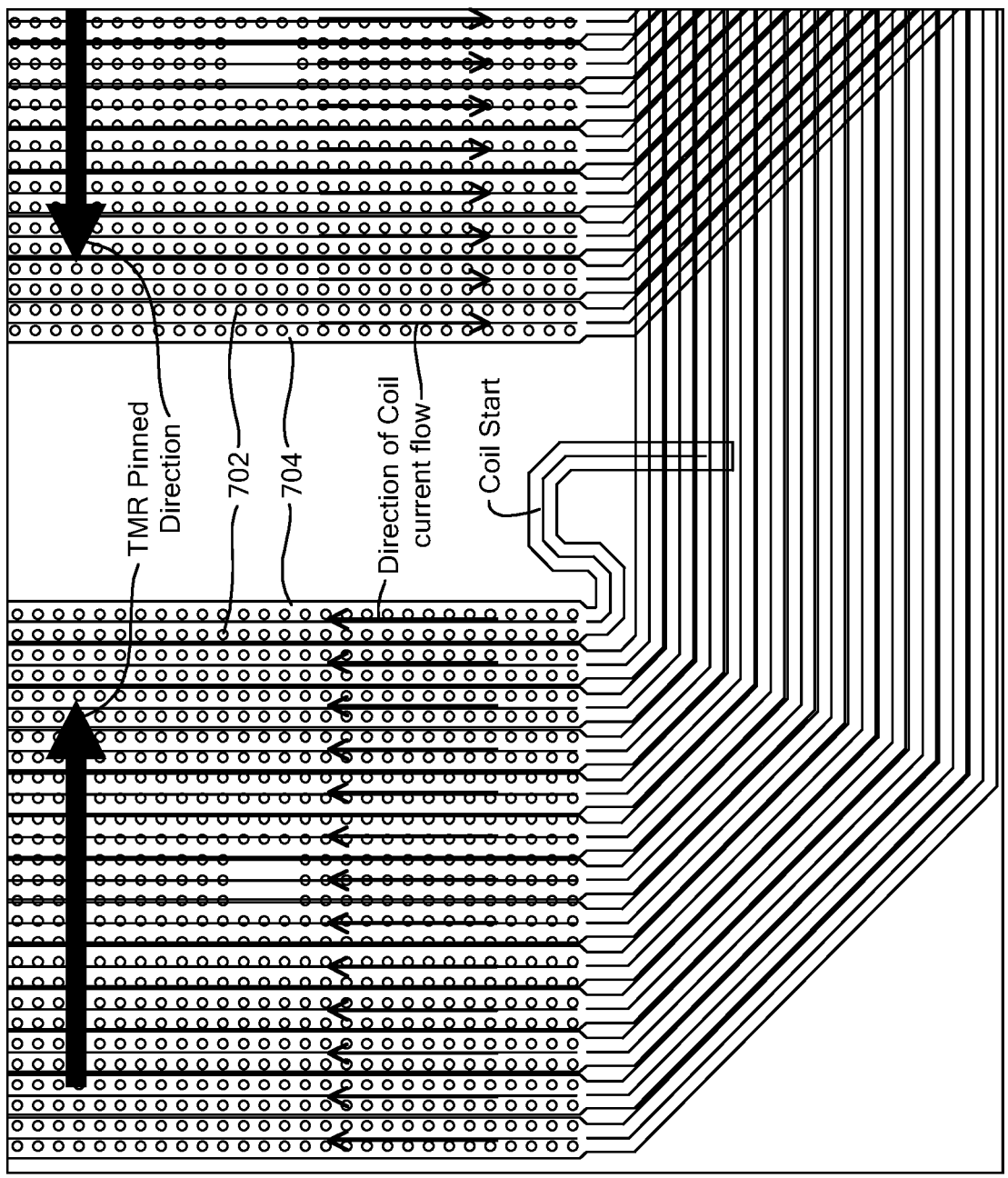
FIG. 7D is a schematic representation showing further detail of the coil routing under pillars in the TMR arrays of FIG. 6.

FIG. 7D shows additional detail for a portion of the array of FIG. 6 with elements in FIGS. 7A and 7B shown where like reference numbers indicate like elements. Horizontal arrows indicate pinning direction for the pillars 702. Coil metal routing 704 conducts current flow in a direction indicated by the vertical arrows to stimulate the pillars 702. As can be seen, a first end of the coil 704 can be connected to a coil start, which can connect to an energy source (not shown) to control current in the coil.

Figure 8:
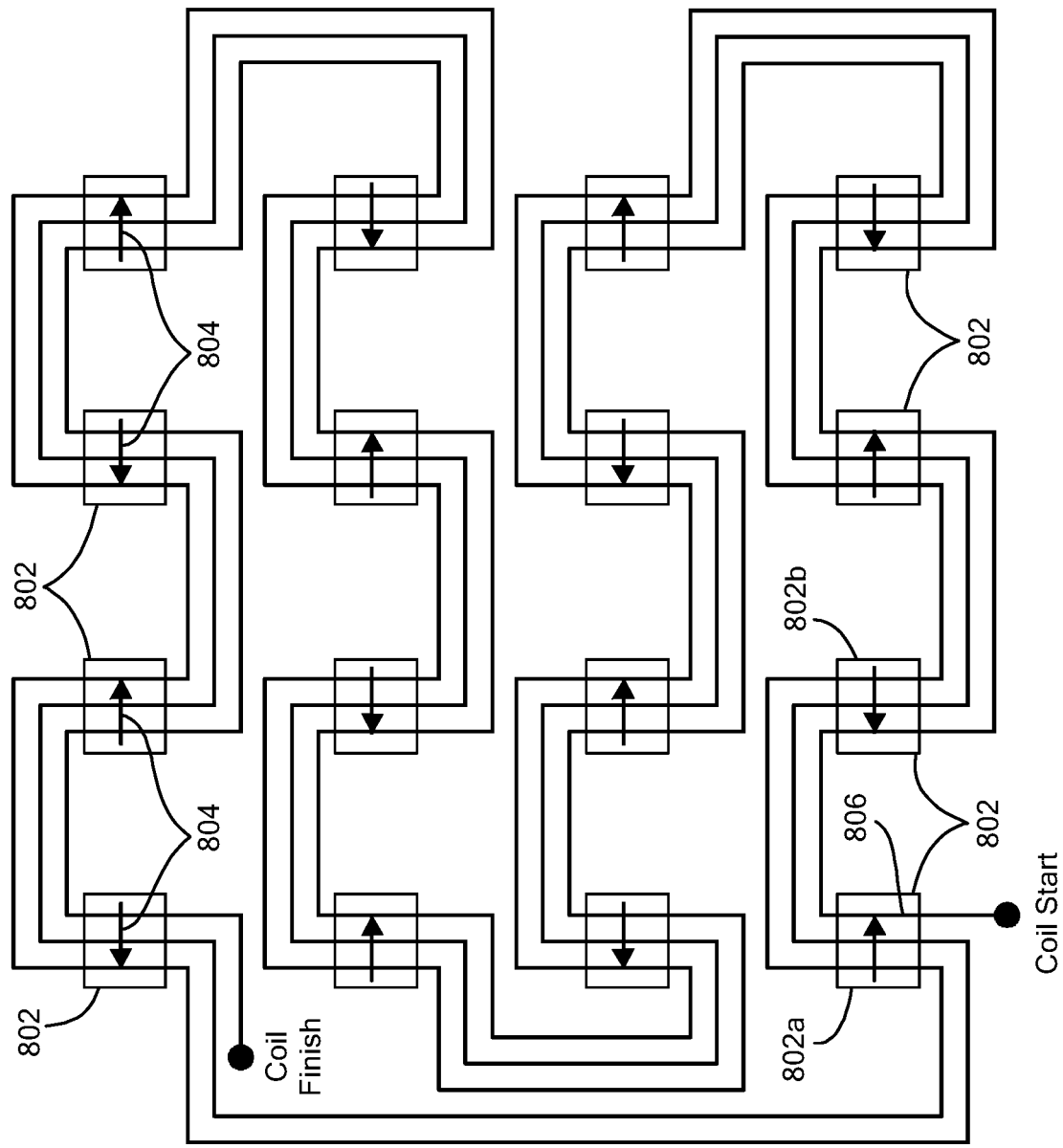
FIG. 8 shows a TMR arrays pinned in alternating directions with checker patterned coil routing.

FIG. 8 is a schematic representation of an example TMR array configuration 800 having a checkered routing pattern. As can be seen, TMR elements are grouped into 16 arrays 802 in four columns where adjacent MR arrays 802 are pinned in opposing directions, as indicated by arrows 804 that indicate pinning direction. As can be seen, a coil 806 starts at the bottom of the page up under a first array 802a and down under an adjacent array 802b. With this arrangement, the field generated by the coil 806 has the same relationship to the pinning direction of the arrays 802a,b. The coil 806 continues under each of the arrays 802 to stimulate the TMR elements. In embodiments, the checkered pattern increases robustness against process, temperature, and magnetic field gradients in both the X and Y dimension.

In the illustrated embodiment, the coil 806 is routed in a two-level nested serpentine configuration. The arrays in each row are routed in a serpentine manner from bottom to top, then each row is routed in a serpentine manner from left to right.

Figure 9:
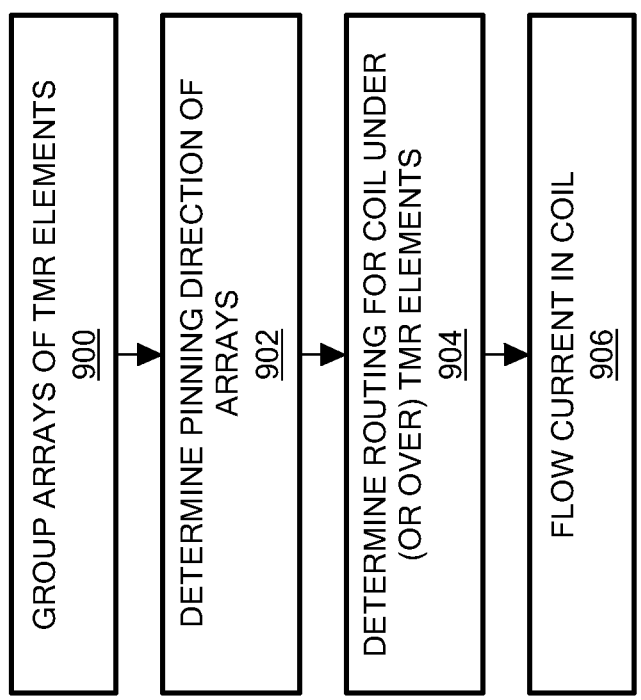
FIG. 9 shows an example sequence of steps for providing an on chip coil-generated magnetic field applied to pinned TMR pillars.

FIG. 9 shows an example sequence of steps for providing an on chip coil-generated magnetic field applied to pinned TMR pillars. In step 900, arrays of TMR elements are grouped, such as in columns. The TMR elements may form a sensing bridge to detect changes in an applied magnetic field. In step 902, a pinning direction for each of the arrays is determined. In step 904, an on-chip coil is routed under the TMR elements in one or more metal layers. In step 906, a current is flowed through the coil to generate a magnetic field to stimulate the TMR elements.

Figure 10:
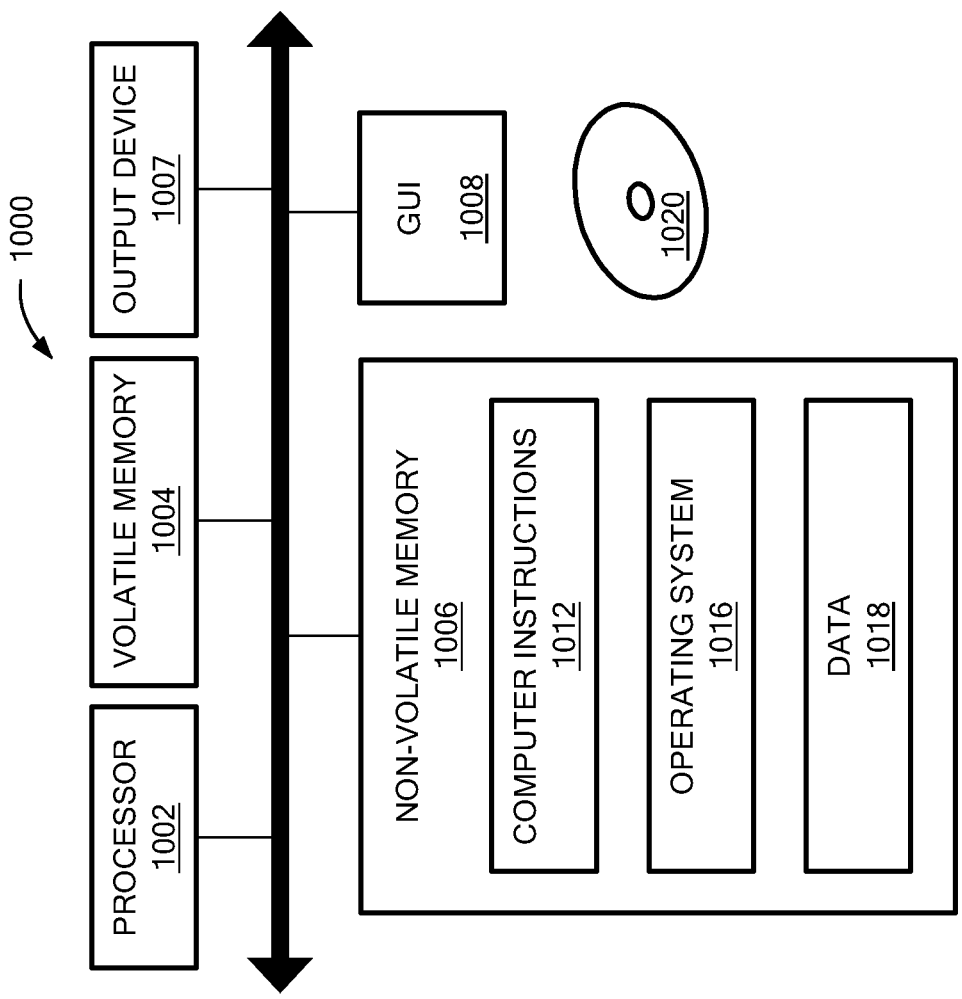
FIG. 10 shows a schematic representation of an example computer that can perform at least a portion of the processing described herein.

FIG. 10 shows an exemplary computer 1000 that can perform at least part of the processing described herein. The computer 1000 includes a processor 1002, a volatile memory 1004, a non-volatile memory 1006 (e.g., hard disk), an output device 1007 and a graphical user interface (GUI) 1008 (e.g., a mouse, a keyboard, a display, for example). The non-volatile memory 1006 stores computer instructions 1012, an operating system 1016 and data 1018. In one example, the computer instructions 1012 are executed by the processor 1002 out of volatile memory 1004. In one embodiment, an article 1020 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable embedded processors executing one or more computer programs to perform the functions of the system. All or part of the system may be implemented as special purpose logic circuitry (e.g., an FPGA (field programmable gate array) and/or an ASIC (application-specific integrated circuit)).

As used herein, the term "anisotropy" or "anisotropic" refer to a particular axis or direction to which the magnetization of a ferromagnetic or ferrimagnetic layer tends to orientate when it does not experience an additional external field. An axial anisotropy can be created by a crystalline effect or by a shape anisotropy, both of which allow two equivalent directions of magnetic fields. A directional anisotropy can also be created in an adjacent layer, for example, by an antiferromagnetic layer, which allows only a single magnetic field direction along a specific axis in the adjacent layer.

In view of the above, it will be understood that introduction of an anisotropy in a magnetic layer results in forcing the magnetization of the magnetic layer to be aligned along that anisotropy in the absence of an external field. In the case of a GMR or TMR element, a directional anisotropy provides an ability to obtain a coherent rotation of the magnetic field in a magnetic layer in response, for example, to an external magnetic field.

In general, magnetic materials can have a variety of magnetic characteristics and can be classified by a variety of terms, including, but not limited to, ferromagnetic, antiferromagnetic, and nonmagnetic. Description of the variety of types of magnetic materials is not made herein in detail. However, let it suffice here to say, that a ferromagnetic material is one in which magnetic moments of atoms within the ferromagnetic material tend to, on average, align to be both parallel and in the same direction, resulting in a nonzero net magnetic magnetization of the ferromagnetic material.

An antiferromagnetic material is one in which magnetic moments within the antiferromagnetic material tend to, on average, align to be parallel, but in opposite directions in sub-layers within the antiferromagnetic material, resulting in a zero net magnetization.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field. As used herein, the terms "target" and "magnetic target" are used to describe an object to be sensed or detected by a magnetic field sensor or magnetic field sensing element.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise specified, the term "substantially" refers to values that are within ±10%. For example, a first direction that is "substantially" perpendicular to a second direction may refer to a first direction that is within ±10% of making a 90° angle with the second direction.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A magnetic field sensor IC package device, comprising:
   groups of arrays having TMR elements, wherein each of the TMR elements has a pinning direction; and
   an on-chip coil routed under the TMR elements configured to conduct current for generating a magnetic field to stimulate the TMR elements, wherein the device is configured to sense changes in an applied magnetic field,
   wherein the magnetic field generated by the coil is configured to cause a resistance of a bridge formed by the TMR arrays to change but not to cause the bridge to generate a differential output voltage.

2. The device according to claim 1, wherein the on-chip coil is formed in one or more metal layers of the device.

3. The device according to claim 1, wherein the on-chip coil is formed in one single metal layer.

4. The device according to claim 1, wherein a first end of the coil is configured to connect to a current source for generating the magnetic field in a direction that matches the pinning direction of the TMR elements.

5. The device according to claim 1, wherein a first end of the coil is configured to connect to a current source for generating the magnetic field in a direction that is an opposite direction of the pinning direction of the TMR elements.

6. The device according to claim 1, wherein the TMR arrays are connected to form a bridge.

7. The device according to claim 1, wherein routing of the coil is serpentine.

8. The device according to claim 1, wherein the coil is configured to stimulate all of the TMR elements with a same polarity magnetic field.

9. The device according to claim 1, wherein the TMR arrays are arranged in columns.

10. The device according to claim 1, wherein the TMR arrays are coupled to form a bridge having total resistance that changes as a function of a level of current through the on-chip coil.

11. A method, comprising:
    employing groups of arrays having TMR elements in a magnetic field sensor IC package device, wherein each of the TMR elements has a pinning direction; and
    employing an on-chip coil routed under the TMR elements configured to conduct current for generating a magnetic field to stimulate the TMR elements, wherein the device is configured to sense changes in an applied magnetic field,
    wherein the magnetic field generated by the coil is configured to cause a resistance of a bridge formed by the TMR arrays to change but not to cause the bridge to generate a differential output voltage.

12. The method according to claim 11, wherein the on-chip coil is formed in one or more metal layers of the device.

13. The method according to claim 11, wherein the on-chip coil is formed in one single metal layer.

14. The method according to claim 11, wherein a first end of the coil is configured to connect to a current source for generating the magnetic field in a direction that matches the pinning direction of the TMR elements.

15. The method according to claim 11, wherein a first end of the coil is configured to connect to a current source for generating the magnetic field in a direction that is an opposite direction of the pinning direction of the TMR elements.

16. The method according to claim 11, wherein the TMR arrays are connected to form a bridge.

17. The method according to claim 11, wherein routing of the coil is serpentine.

18. The method according to claim 11, wherein the coil is configured to stimulate all of the TMR elements with a same polarity magnetic field.

19. The method according to claim 11, wherein the TMR arrays are arranged in columns.

20. The method according to claim 11, wherein the TMR arrays are coupled to form a bridge having total resistance that changes as a function of a level of current through the on-chip coil.

* * * * *